May 5, 1942.  W. L. KEEHN  2,282,137
TRAILER LOADER
Filed Oct. 2, 1940  2 Sheets-Sheet 1
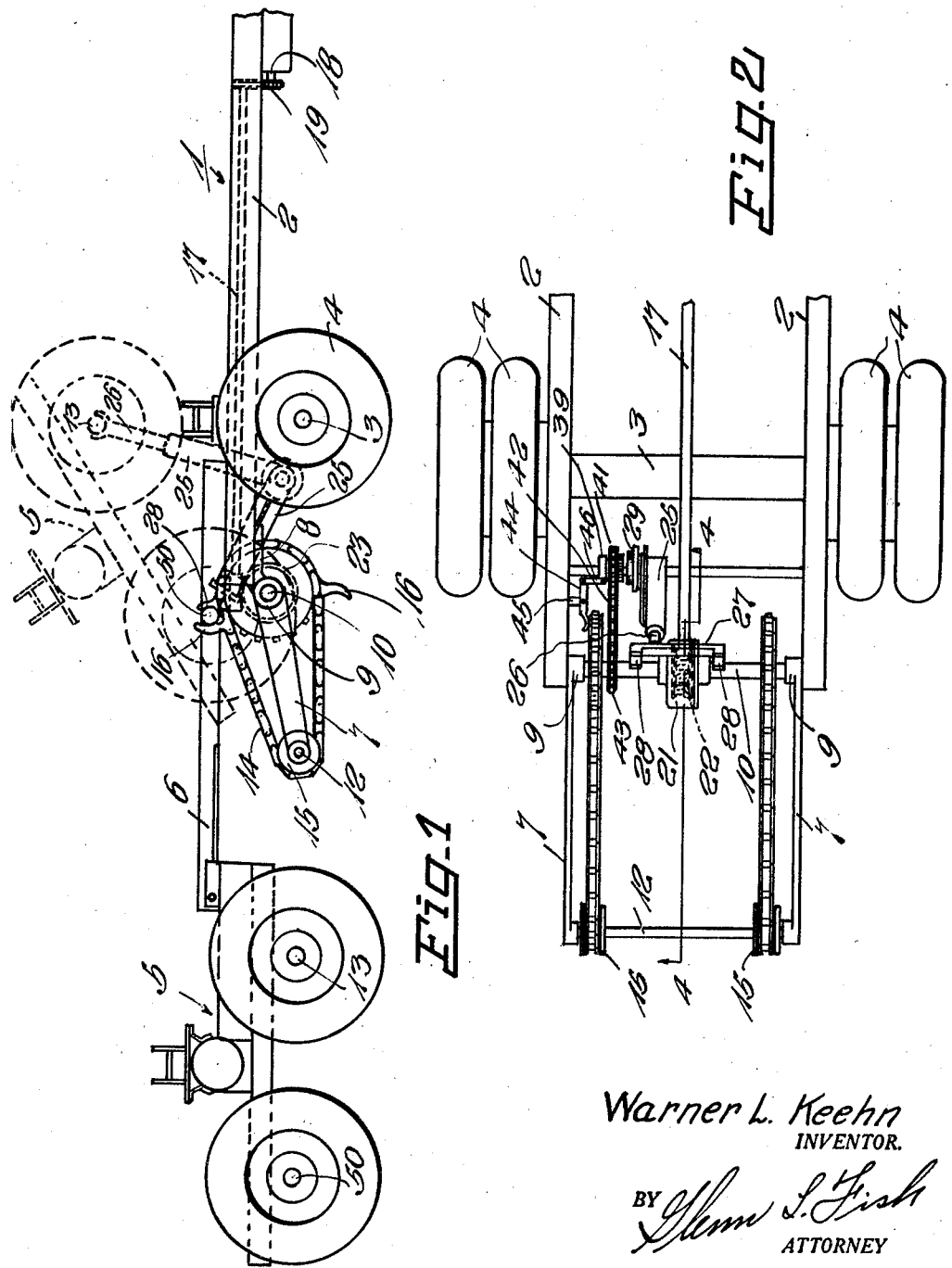
Warner L. Keehn
INVENTOR.
BY Glenn S. Fish
ATTORNEY

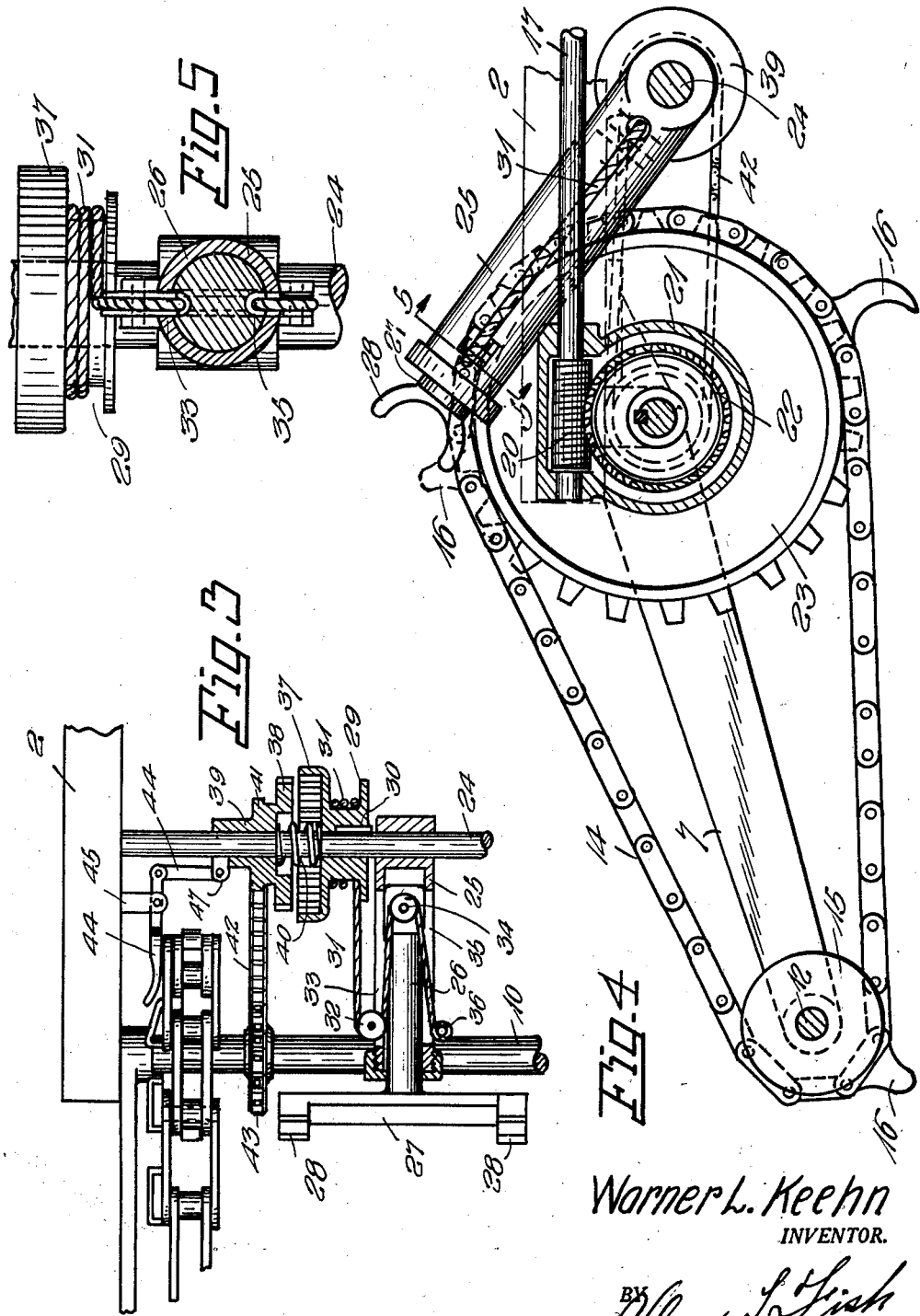

Patented May 5, 1942

2,282,137

UNITED STATES PATENT OFFICE 2,282,137

TRAILER LOADER

Warner L. Keehn, Spokane, Wash.

Application October 2, 1940, Serial No. 359,448

6 Claims. (Cl. 214—65)

This invention relates to a trailer loader which constitutes an attachment for a logging truck. In order to support long logs, a trailer is towed back of the truck and when the log is delivered and the empty truck is returning for another log, the trailer has a tendency to whip back and forth transversely of the truck and make it difficult to drive the truck.

Therefore, one object of the invention is to provide an attachment constituting a loader by means of which an empty trailer may be moved into position over the rear portion of the truck where it will not rest on the ground and be subject to whipping and, in addition, add weight to the rear end of the truck and cause the driving wheels thereof to be held firmly in engagement with the ground and thus produce the proper amount of traction.

Another object of the invention is to so form the attachment that it may be driven from a power take-off shaft of the truck and thus allow the engine of the truck to serve as a power unit for operating the loading device.

Another object of the invention is to provide a loading device wherein sprocket chains constitute means for moving the trailer into position for a jack to engage the front axle of the trailer and shift the trailer forwardly and upwardly into position over the rear end of the truck, the chains also carrying hooks for engaging the rear axle of the trailer and thus bracing the loaded trailer against rearward movement.

Another object of the invention is to provide the loader with actuating means for the jack including a drum and a drive for the drum which is automatically rendered operative when the trailer is advanced into position for its front axle to engage the cross head or cradle of the jack.

In the accompanying drawings:

Fig. 1 is a side elevation showing a trailer mounted back of a logging truck equipped with a trailer loader of the improved construction.

Fig. 2 is a top plan view of the loader and the rear portion of the truck.

Fig. 3 is a view on an enlarged scale showing a portion of the loader and the rear end of the truck partially in top plan and partially in section.

Fig. 4 is a sectional view on an enlarged scale, on the line 4—4 of Fig. 2.

Fig. 5 is a fragmentary sectional view on the line 5—5 of Fig. 4.

The truck 1 is a logging truck of conventional construction and includes the usual side bars 2 and rear axle carrying drive wheels 4 by means of which the truck is propelled forwardly. The trailer 5 is equipped with a reach bar 6 by means of which the trailer is hitched back of the truck in the usual manner, it being understood that the reach bar will be of the length required by the length of the logs hauled. It will also be understood that the reach bar may be left attached to the trailer when the trailer is loaded on the rear end of the truck and rest upon the cab or it may be detached from the trailer and placed in any convenient position on the truck when making a return trip with an empty truck.

The loading apparatus or attachment has side bars 7 formed of strong metal and fixedly secured at their front ends to the side bars 2 of the truck by mounting members 8. At their front ends the side bars 7 are formed with bearings 8 in which a main shaft 10 is rotatably mounted and, at their rear ends, the bars 7 are formed with bearings 11 for mounting a shaft 12. Attention is called to the fact that the side bars of the attachment extend rearwardly at a downward incline so that when the trailer is to be loaded onto the truck it may be easily moved forwardly to a position in which its front axle 13 extends across rear end portions of the side bars 7 and also across rear portions of sprocket chains 14. These chains 14 are trained about grooved pulleys 15 carried by the rear shaft 12 and carry hooks 16 for engaging front and rear axles of the trailer in a manner to be hereinafter set forth.

Rotary motion is imparted to the drive shaft 10 through the medium of a transmission shaft 17 which extends longitudinally of the truck and has its front end geared to the power take-off shaft 18 as shown at 19. The rear end of the transmission shaft 17 carries a worm 20 and is rotatably mounted through the upper portion of a gear housing 21 so that the worm meshes with a worm gear 22 keyed to the drive shaft 10 within the gear housing, as shown in Fig. 4. By this arrangement, the drive shaft will be powered from the power take-off shaft 18 and, since the drive shaft carries large sprockets 23 about which the sprocket chains 14 are trained, motion will be imparted to the chains during operation of the loading mechanism.

A countershaft 24 extends transversely of the truck forwardly of the drive shaft 10 and carries a jack 25 which is mounted for swinging movement about the shaft. The plunger 26 of the jack projects from the outer free end thereof and carries a cross head or cradle 27 having seats 28 at its ends and normally the jack is disposed rearwardly at an upward incline, as shown in Figs. 1 and 4, in such position that when the trailer is moved forwardly by hooks of the sprocket chains, the front axle of the trailer will be engaged in the seats 28 of the cross head.

At this time, the jack is to be swung forwardly and upwardly and its plunger 26 moved to extended position in which it will support the trailer over the rear portion of the truck. In order to do so, there has been provided a drum 29 which is keyed to the countershaft, as shown at 30, in Fig. 3, and carries a cable 31 which is wound about the drum. This cable extends from the drum toward the free end of the jack and after being engaged about the pulley 32, passes into the cylinder of the jack through a slot 33 in one side thereof, the cable being then engaged about the pulley 34 at the inner end of the plunger 26 and then outwardly through slot 35 with its end anchored to the jack cylinder, as shown at 36. When the drum is turned to wind the cable thereon the portion of the cable within the jack cylinder exerts pull upon the lower or inner end of the plunger and shifts the plunger outwardly. At the same time, pull exerted by the cable swings the jack upwardly and forwardly from the position shown in full lines in Fig. 1, to the position indicated by dotted lines, and since the front axle of the trailer rests in the seats 28 of the cross head 27, the trailer will be moved forwardly with the jack and supported in the position indicated by dotted lines in this figure.

Referring to Fig. 3, it will be seen that the drum 29 carries an internally toothed flange or gear 37 for engagement by the teeth of a companion gear 38 carried by a clutch member 39 which fits loosely about the countershaft and is normally held out of driving engagement with the gear 37 by a spring 40. The clutch member 39 is formed with a sprocket wheel 41 engaged by a chain 42 which is trained about a sprocket wheel 43 carried by the drive shaft 10 so that rotary motion will be transmitted from shaft 10 to the clutch member.

The clutch member is to be shifted to its operative position when the front axle of the trailer is seated in the seats 28 and held in operative position during movement of the trailer to loaded position over the rear portion of the truck. In order to accomplish this, there has been provided a lever 44 which is pivoted to the bracket 45 carried by the adjacent side bar of the truck. This lever extends longitudinally of the truck and has its front end pivoted to a link 46 extending longitudinally of the countershaft and pivoted to the ear 47 of the shiftable clutch member. When the lever is swung about its pivot by cam brackets 48, which project laterally from links of the adjacent sprocket chain 14, the clutch member will be thrust toward the drum and the teeth of its gear 38 mesh with teeth of the internal gear 37. The cam brackets extend for only a portion of the length of the sprocket chain carrying them and this length is such that the movable clutch member will only be held in its operative position a sufficient time to allow the jack to move to its raised position. The cam brackets then move out of engagement with the lever 44 and the spring 40 returns the movable clutch member to its normal position, in which position it is free from the drum. The front wheels of the trailer will now rest upon the bunk 49 extending across the rear portion of the truck and the rear axle 50 of the trailer will be engaged by other hooks of the chains 14 and the trailer braced against rearward movement. It will thus be seen that a trailer may be very easily loaded on the rear portion of a truck where it will constitute a weight for holding the rear driving wheels of the truck in firm traction-creating engagement with the ground and, in addition, the trailer will be transported upon the truck instead of being hitched to the rear end thereof and subjected to whipping movement while driving an empty truck along rough roads. When the trailer is to be unloaded from the truck, it is merely necessary to reverse rotation of the power take-off or the transmission shaft and the jack and sprocket chains will be moved in an inloading direction.

Having thus described the invention, what is claimed is:

1. In combination with a truck, a conveyor at the rear of the truck extending forwardly at an upward incline for advancing a trailer forwardly toward a loaded position on the truck, longitudinally extensible means pivoted at its lower end to the truck and adjusted for engaging the advancing trailer and swinging the advancing trailer upwardly and forwardly and supporting the trailer in loaded position over the truck, and actuating means for swinging the supporting means upwardly and forwardly and extending the support longitudinally during swinging movement thereof including a clutch moved into operative position by said conveyor.

2. In combination with a truck having a power take-off shaft, a conveyor at the rear of the truck for engaging a trailer and shifting the trailer forwardly and upwardly, means for transmitting movement from the power take-off to said conveyor, a jack movably mounted at the rear end of the truck in cooperating relation to the front end of the conveyor, said jack having means for engaging the front axle of a trailer moved forwardly by the conveyor, means for swinging the jack upwardly and forwardly to raised position for supporting the trailer over the rear portion of the truck, actuating means for the jack including a clutch having a driven member and a companion member shiftable into and out of clutching engagement with the driven member, actuating means for the shiftable clutch member, means carried by the conveyor for operating the actuating means for the shiftable clutch member and rendering the jack operative as the conveyor moves a trailer into position for engagement of the jack with the front axle of the trailer, and means carried by the conveyor for engaging the rear axle of the trailer to brace the trailer against rearward movement after the jack has been swung upwardly and forwardly to a position for supporting the trailer in loaded position over the truck.

3. In combination with a truck having a power take-off shaft, a conveyor having a frame extending rearwardly at a downward incline from the rear end of said truck and sprocket chains movably mounted in the frame, hooks carried by the sprocket chains for engaging the front axle of a trailer and moving the trailer forwardly toward the truck, a jack pivotally mounted in cooperating relation to the front end of the conveyor for engaging the front axle of an advancing trailer, actuating means for swinging the jack upwardly and forwardly to a position for supporting a trailer in loaded position over the rear portion of the truck, the actuating means including a clutch having a member movable into and out of operative position, a member carried by the conveyor for effecting movement of the clutch member to operative position when the front axle of the trailer is engaged by the jack, and hooks carried by the sprocket chains for engaging the rear axle of the trailer and bracing the trailer against rearward movement after the jack has been swung to raised position.

4. In combination with a truck having a power take-off shaft, mechanism for loading a trailer on the truck comprising a conveyor having a frame extending rearwardly from the truck and front and rear shafts, the front shaft constituting a drive shaft, sprocket wheels carried by the drive shaft, conveyor chains extending longitudinally in the conveyor frame and trained about the sprocket wheels of the drive shaft, members carried by said chains for engaging the trailer and moving the trailer forwardly over the conveyor, a countershaft rotatably mounted across the truck in front of the drive shaft, a jack having a cylinder loosely mounted on the countershaft for swinging movement upwardly and forwardly from lowered position to raised position, a plunger slidable in the cylinder and having a cradle at its outer end for engaging the front axle of a trailer as the trailer is moved forwardly by the conveyor chains, a drum fixed to the countershaft, a cable wound upon the drum and secured at its outer end, said cable having a portion passing through the jack cylinder and engaging inner end of the plunger, a clutch loose on the countershaft and yieldably held out of engagement with the drum, means for transmitting rotary motion from the drive shaft to the clutch, and means actuated from a conveyor chain for moving the clutch to operative position for turning the drum and winding the cable thereon to shift the plunger outwardly and swing the jack upwardly to raised position and thereby moving a trailer forwardly over the rear end portion of the truck and supporting the trailer.

5. In combination with a truck having a power take-off shaft, mechanism for loading a trailer on the truck comprising a conveyor having a frame extending rearwardly from the truck and front and rear shafts, the front shaft constituting a drive shaft, sprocket wheels carried by the drive shaft, conveyor chains extending longitudinally in the conveyor frame and trained about the sprocket wheels of the drive shaft, members carried by said chains for engaging the trailer and moving said trailer forwardly over the conveyor, a countershaft rotatably mounted across the truck in front of the drive shaft, a jack having a cylinder loosely mounted on the countershaft for swinging movement upwardly and forwardly from lowered position to raised position, a plunger slidable in the cylinder and having a cradle at its outer end for engaging the front axle of the trailer as the trailer is moved forwardly by the conveyor chains, a drum fixed to the countershaft, a cable wound upon the drum and secured at its outer end, said cable having a portion passing through the jack cylinder and engaging inner end of the plunger, an internally toothed flange carried by said drum at one side thereof, a clutch member loose on said countershaft and urged away from the flanged side of said drum, a gear carried by said clutch member for fitting within the flange of the drum and meshing with teeth thereof when the clutch is shifted toward the drum to operative position for rotating the drum and winding the cable thereon to shift the plunger outwardly and swing the jack upwardly and forwardly to raised position, the clutch when swung to raised position moving the trailer forwardly and supporting same over the rear portion of the truck, means for transmitting rotary motion from the drive shaft to said clutch, and means for shifting the clutch toward its operative position adapted to be actuated by one of the conveyor chains.

6. In combination with a truck having a power take-off shaft, mechanism for loading a trailer on the truck comprising a conveyor having a frame extending rearwardly from the truck and front and rear shafts, the front shaft constituting a drive shaft, sprocket wheels carried by the drive shaft, conveyor chains extending longitudinally in the conveyor frame and trained about the sprocket wheels of the drive shaft, members carried by said chains for engaging the trailer and moving the trailer forwardly over the conveyor, a countershaft rotatably mounted across the truck in front of the drive shaft, a jack having a cylinder loosely mounted on the countershaft for swinging movement upwardly and forwardly from lowered position to raised position, a plunger slidable in the cylinder and having a cradle at its outer end for engaging the front axle of a trailer as the trailer is moved forwardly by the conveyor chains, a drum fixed to the countershaft, a cable wound upon the drum and secured at its outer end, said cable having a portion passing through the jack cylinder and engaging the inner end of the plunger, a clutch loose on countershaft and yieldably held out of engagement with the drum, means for transmitting rotary motion from the drive shaft to the clutch, a lever pivoted to a side bar of the truck and extending longitudinally thereof back of the countershaft, a link connecting the front end of the lever with said clutch, and cam members carried by an adjacent conveyor chain for engaging the lever and tilting said lever about its pivot to apply pressure to the clutch member and shift the clutch member into operative engagement with the drum.

WARNER L. KEEHN.